(12) United States Patent
Edelson

(10) Patent No.: US 6,837,141 B1
(45) Date of Patent: Jan. 4, 2005

(54) POLYPHASE HYDRAULIC DRIVE SYSTEM

(75) Inventor: Jonathan Sidney Edelson, Somerville, MA (US)

(73) Assignee: Borealis Technical Limited, Gibraltar ( * ) Notice: Subject to any disclaimer, the term of this patent is extended or adjusted under 35 U.S.C. 154(b) by 72 days.

(21) Appl. No.: 10/414,987

(22) Filed: Apr. 15, 2003

Related U.S. Application Data

(60) Provisional application No. 60/372,891, filed on Apr. 15, 2002.

(51) Int. Cl.$^7$ .................................................. F01B 1/06
(52) U.S. Cl. ............................................. 91/491; 92/72
(58) Field of Search ....................... 60/539, 487, 491; 91/491, 492; 92/72

(56) References Cited

U.S. PATENT DOCUMENTS

| | | | | |
|---|---|---|---|---|
| 2,186,556 A | * | 1/1940 | Robbins | 60/487 |
| 3,765,183 A | * | 10/1973 | Baurle | 91/492 |
| 3,961,558 A | * | 6/1976 | Dokukin et al. | 91/491 |
| 5,224,411 A | * | 7/1993 | Fillion | 91/491 |
| 5,657,681 A | | 8/1997 | Henricson | |
| 5,689,956 A | | 11/1997 | Reboredo | |
| 5,956,953 A | | 9/1999 | Folsom et al. | |
| 6,279,520 B1 | * | 8/2001 | Lowi, Jr. | 123/56.1 |

* cited by examiner

Primary Examiner—Thomas E Lazo

(57) ABSTRACT

The present invention comprises an input drive system, which provides a plurality of phases of oscillating fluid flow, and an output drive system connected directly to the input drive system that is powered by the plurality of phases of oscillating fluid flow. The input drive system comprises a plurality of pistons that are caused to move in a reciprocating fashion by a power source. The power source may be a rotating power source, such as that provided by an electric motor, a diesel or petrol engine, or a turbine system. The input drive system comprises a cam ring attached to a rotating power source, a plurality of cam rollers in contact with the cam ring; and a plurality of pistons attached to the cam rings. The output drive system comprises one or more pistons that are attached to move in a reciprocating fashion by the oscillating fluid flow provided by the input drive system. The output drive system comprises a cam ring attached to a load, a plurality of cam rollers in contact with the cam ring, and a plurality of pistons attached to the cam rings.

18 Claims, 3 Drawing Sheets

POLYPHASE HYDRAULIC DRIVE SYSTEM

CROSS-REFERENCE TO RELATED APPLICATIONS

This application claims the benefit of U.S. Provisional Application No. 60/372,891, filed 15 Apr. 2002.

BACKGROUND OF THE INVENTION

The present invention relates to hydraulic drive systems for gear-less inter-conversion of rotational energy and gear-less conversion of rotational energy to linear kinetic energy.

Henricson (U.S. Pat. No. 5,657,681) discloses a hydraulic drive system comprising a plurality of hydraulically driven piston units with cam rollers, which are disposed to act against a wave-shaped cam profile of a cam curve element, so that linear movement of the cam rollers against the cam profile produces a relative driving movement between the cam element and the piston units. The characterizing feature of the invention is that the drive system is composed of separate, assembled cam curve element modules and separate assembled piston units.

Reboredo (U.S. Pat. No. 5,689,956) discloses a hydraulic variable speed drive assembly including a hydraulic pump having a cylinder with an associated end cover, a hydraulic motor having a cylinder with an associated end cover, and an intermediate plate with ports or passages for enabling a flow of fluid from the hydraulic pump to the hydraulic motor at a high pressure and from the hydraulic motor to the hydraulic pump at a low pressure, in order to close the circuit. The shafts of the rotors of the hydraulic pump and the hydraulic motor have a common geometric axis, static with respect to the outside, about which they can rotate independently, this rotation being their only possible movement. The variable drive assembly has as its only possible movement, the rotation about a geometric axis fixed with respect to the outside and is different from the geometric axis of the hydraulic pump cylinder, from the geometric axis of the hydraulic motor cylinder, and from the common geometric axis of the rotors. The rotation of the variable drive assembly is effected from the outside and results in that the hydraulic pump cylinder and the hydraulic motor cylinder approach or withdraw their geometric axes with respect to those of their corresponding rotors, thus causing variation of the ratio between the rotation speeds of the hydraulic pump rotor and of the hydraulic motor rotor.

Folsom and Tucker (U.S. Pat. No. 5,956,953) disclose an infinitely variable hydrostatic transmission that includes a radial piston pump having outwardly opening pump cylinders containing radial pump pistons, and a radial piston motor, arranged concentrically around the pump, having inwardly opening motor cylinders containing radial motor pistons. Fluid passages in the transmission intermittently connect the pump cylinders and the motor cylinders in a closed fluid flow circuit. A flexible cam ring is radially interposed between the pump and the motor in load bearing relation to the pump pistons on an inside surface of the cam ring, and in load bearing relation to the motor pistons on an outside surface of the cam ring. An input shaft is coupled in torque driving relation to the pump, and an output shaft is coupled in torque driven relation through a commutator plate to the cam ring. An adjustment mechanism is provided for adjusting the cam ring to a desired radial profile to set the transmission to a desired transmission ratio. A fluid distribution system has passages, including kidney shaped slots through the commutator plate, for fluid flow of fluid pressurized in the pump cylinders to the motor cylinders during a power stroke of the pump and motor pistons, and for fluid flow of spent fluid from the motor cylinders to the pump cylinders during a suction phase of the stroke of the pump and motor pistons. A control system adjusts the profile of the cam ring to control the transmission ratio, and a pressure compensator automatically reduces the transmission ratio when the resistance torque on the output shaft exceeds a predetermined value, as when the vehicle is ascending a steep hill.

These systems use a hydraulic pump and a system of valves to apply hydraulic power to the cam ring. Such valve systems add extra complexity to the design of these systems, and they require associated controlling mechanisms. In addition valve systems introduce some inefficiency into the device, and require maintenance.

BRIEF SUMMARY OF THE INVENTION

Thus a need has arisen for a valve-less hydraulic drive system.

The present invention comprises an input drive system, which provides a plurality of phases of oscillating fluid flow, and an output drive system connected directly to the input drive system that is powered by the plurality of phases of oscillating fluid flow.

In one embodiment, the input drive system comprises a plurality of pistons that are caused to move in a reciprocating fashion by a power source. In a preferred embodiment, the power source may be a rotating power source, such as that provided by an electric motor, a diesel or petrol engine, or a turbine system.

In a further embodiment, the input drive system comprises a cam element having a wave-shaped profile attached to a power source; a plurality of cam rollers in contact with the cam element; and a plurality of pistons attached to one or more hydraulic fluid lines and to the cam rollers, so that a movement of the wave-shaped profile against the cam rollers produces a plurality of phases of oscillating fluid flow in the hydraulic fluid lines, and the relative position of the cam rollers against the cam element determines a relative phase angle for the oscillating fluid flows.

In a further embodiment, the output drive system comprises one or more pistons that are caused to move in a reciprocating fashion by the oscillating fluid flow provided by the input drive system.

In a further embodiment, the output drive system comprises a cam element attached to a load; a plurality of cam rollers in contact with the cam element; and a plurality of pistons attached to one or more hydraulic fluid lines and to the cam rollers, so that a movement of the cam rollers caused by said oscillating fluid flow against the wave-shaped profile produces a movement of the cam element.

A technical advantage of the present invention is that the input drive system is connected directly to the output drive system, thereby eliminating the need for valves.

BRIEF DESCRIPTION OF THE SEVERAL VIEWS OF THE INVENTION

For a more complete understanding of the present invention and the technical advantages thereof, reference is made to the following description taken with the accompanying drawings, in which.

DETAILED DESCRIPTION OF THE INVENTION

Figure 2A:
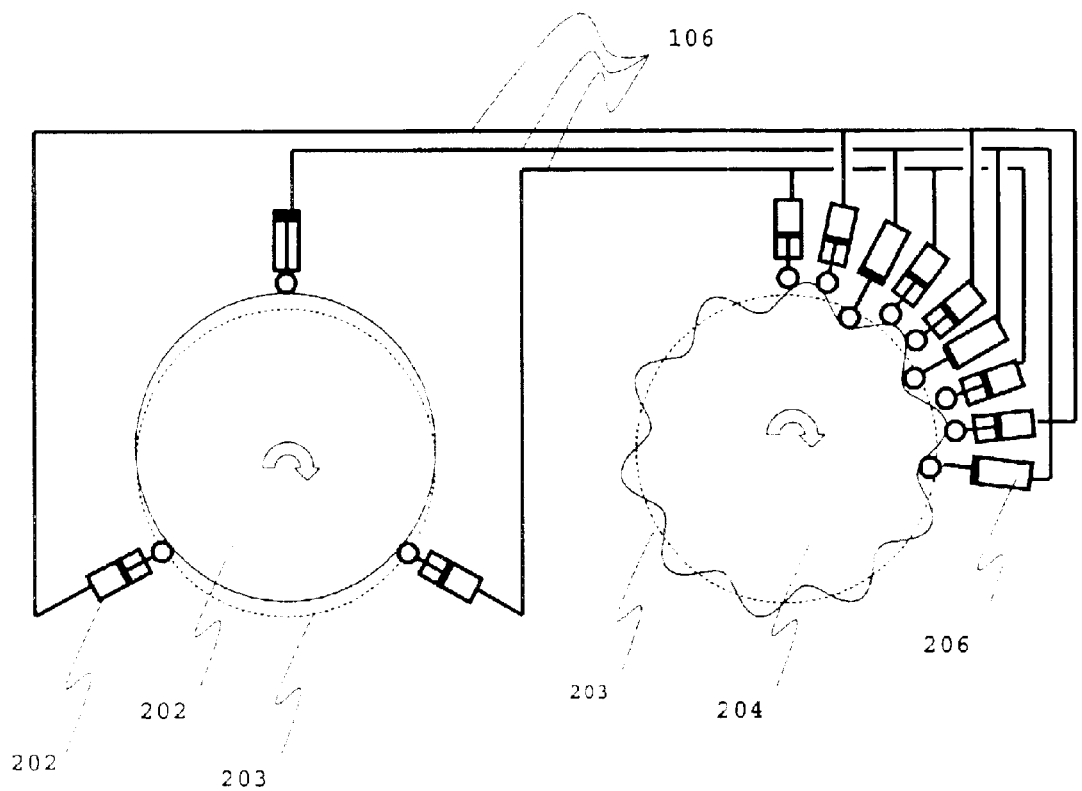
FIGS. 2a and 2b are diagrammatic representations of the present invention showing an input drive system cam ring connected to an output drive system cam ring.
Figure 2B:
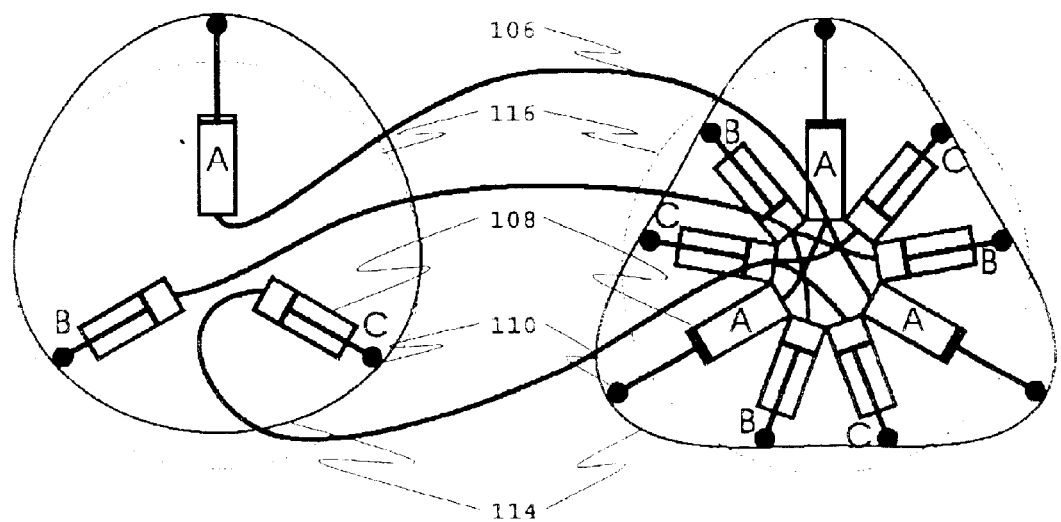
Figure 3:
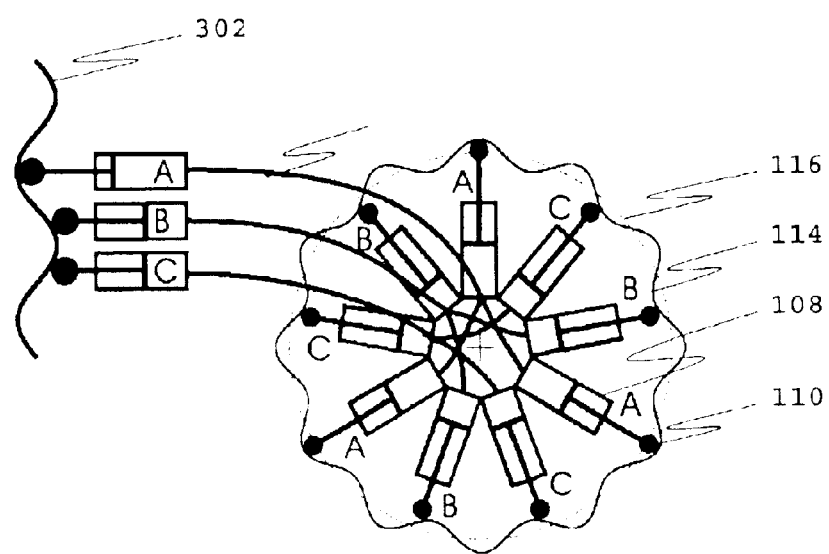
FIG. 3 is a diagrammatic representation of a linear drive system and a rotational drive system.

An embodiment of the present invention and its advantages are best understood by referring in more detail to FIGS. 1 through 3, in which like numerals refer to like parts throughout.

Figure 1A:
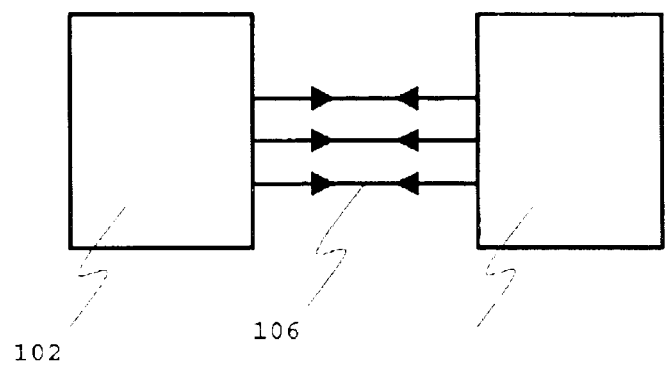
FIG. 1a is a schematic of the present invention, showing an input drive system connected directly to an output drive system by three independent hydraulic fluid lines.
Figure 1B:
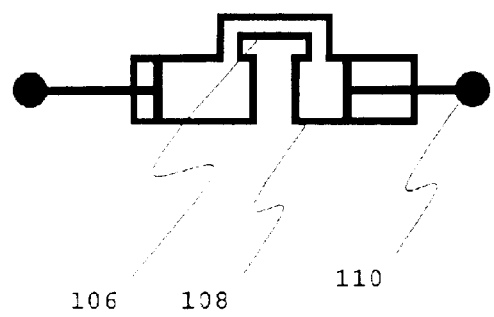
FIG. 1b illustrates simple direct coupling between two pistons, and shows their use in the polyphase hydraulic drive of the present invention.
Figure 1C:
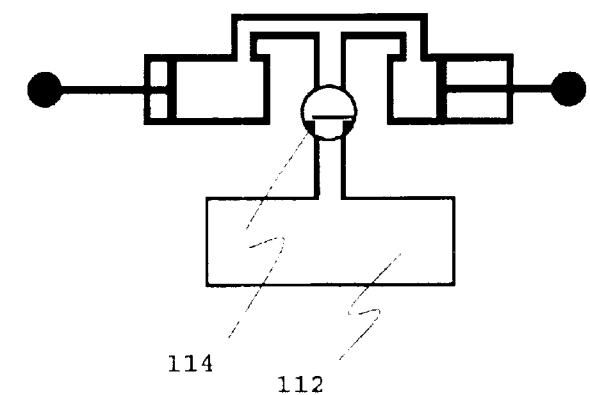
FIG. 1c illustrates a system for maintaining hydraulic fluid levels, and shows how the polyphase hydraulic drive may be used to power a linear output drive system.

Referring now to FIG. 1a, which shows a simple schematic of the present invention, an input drive system 102 and output drive system 104 are directly connected by hydraulic lines 106. In this example, the input drive system produces three phases of oscillating fluid output, and these are fed independently and directly to the output drive system by three fluid lines. The connection between the hydraulic elements on the input drive side and the output drive side may be achieved in a number of ways known to the art. For example, the hydraulic elements may be two piston units 108 with cam-followers 110 directly connected as shown in FIG. 1b. The pistons are very simple single port pistons, with drive and driven pistons directly connected. The piston pair can be connected via a check valve 114 to a fluid reservoir 112, in order to compensate for leaks. If the pressure in the piston pair ever falls below the supply level, then hydraulic fluid is added to the system, as shown in FIG. 1c.

Figures 1D, 1E:
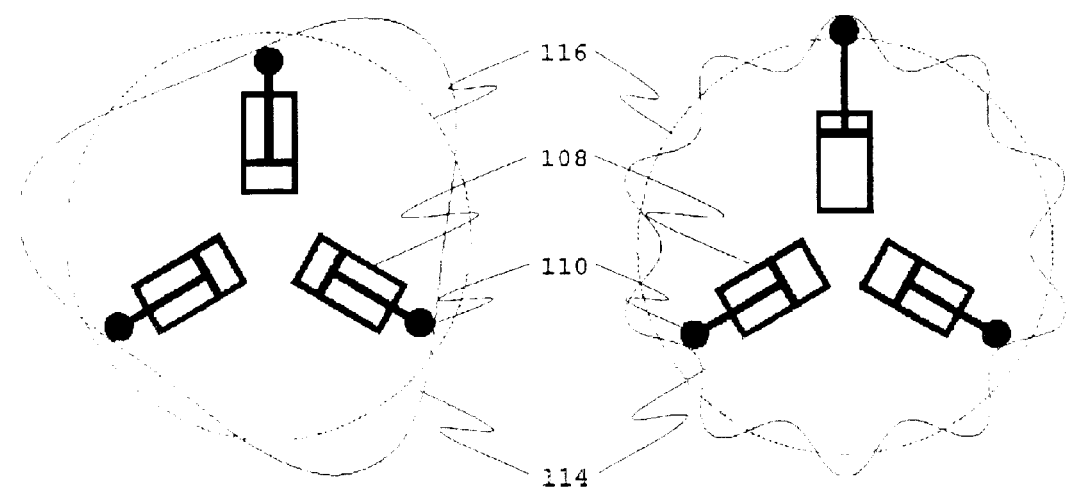
FIGS. 1d and 1e are diagrammatic representations of input and/or output drive systems of the present invention.

Referring now to FIGS. 1d and 1e, which shows in diagrammatic form how the piston units may be actuated by a cam ring, three piston units 108 are arranged as shown so that their cam-followers 110 are in contact with a cam ring 114. In this example, one cam ring has 3 lobes and the other has 10 lobes.

The height and number of the lobes on the cam ring govern the displacement of the piston in the piston units. Referring again to FIGS. 1d and 1e, the height of the cam ring, h, relative to the dashed line 116 (which is a circle) is proportional to the sine of the number of lobes multiplied by the relative angle;

$$h \: \alpha \: \sin(\text{number of lobes} \times \text{angle})$$

In one embodiment, each cam ring is mounted on a load-bearing axle, the axle of one cam ring forming an input shaft, and the axle of the other cam ring forming an output shaft. Each cam ring is in contact with a plurality of cam rollers, or cam followers, and each cam roller is attached to a hydraulic piston. The cam rollers of one set of piston may be arranged radially with respect to the cam ring attached to the input shaft so that as the cam ring turns, the cam rollers follow the cam ring and transmit a reciprocating motion into the corresponding pistons. The cam rollers of the other set of pistons are arranged radially with respect to the cam ring attached to the output shaft so that as the pistons move in a reciprocating fashion in response to the reciprocating motion transmitted from the other set of pistons, the cam rollers cause the cam ring to turn. The drive system does not rely on the use of valves. Hydraulic pistons from the input drive and the output drive are connected to each other by means of a sealed connection. In one embodiment, the input shaft is connected to an electric motor, and the output shaft is connected to a load. In another embodiment, the input shaft is connected to a source of rotational energy, and the output shaft is connected to a generator.

For the interconversion of rotational energy, assuming the drive cam element has x lobes and rotates at and angular velocity of y, and the output cam element has a lobes and rotates at and angular velocity of b, then:

$$y/b=a/x$$

Referring now to FIG. 2a, which shows two cam rings for a 10:1 speed reducer, cam ring 202 is part of the input drive system and has one lobe, and cam ring 204 has 10 lobes and is part of the output drive system. In this embodiment, the output drive system cam ring 204 has thirty piston/cam followers 206 arranged evenly around the cam as shown at angles of 0, 12, 24, 36 . . . etc (only 9 are shown for simplicity). The height of the cam ring relative to the dashed line 116 is again shown. The relative phase angle of each piston in the output drive side is thus the angle multiplied by the number of lobes on the cam ring, and is therefore 10×angle, or 0, 120, 240, 360, 0 . . . degrees. Since there are thus only three phases, just three piston/cam followers are placed around the input drive cam ring, and 3 sets of hydraulic pipes 106 connect the input drive system and the output drive system. In general terms, the phase angle φ between each phase is given by:

$$\phi=360\times(\text{number of lobes})/(\text{number of cams})$$

If 360 divided by φ, which is the same as the number of cams divided by the number of lobes, is an integer, then this value is the number of phases. So in the example above, the number of phases=30/10=3. If it is not an integer number, then the number of phases is the lowest integer multiple of this ratio. For example, if there are 24 cams and 10 lobes, then the number of cams divided by the number of lobes= 24/10=2.4. The lowest integer multiple of this ratio is 12, and thus the number of phases would be 12. In the example given below, the number of cams divided by the number of lobes=31/10=3.1. The lowest integer multiple of this ratio is 31, and thus the number of phases is 31.

The relative size of the pistons on the drive side and the driven side are selected so that the piston displacement (piston bore×stroke×number of pistons) is equal.

In a further embodiment, shown in FIG. 2b, cam ring 202 is part of the input drive system and has one lobe, and cam ring 204 has 3 lobes and is part of the output drive system. The output drive system cam ring 204 has nine piston/cam followers 206 arranged evenly around the cam as shown at angles of 0, 40, 80, 120 . . . degrees, etc. The phase angle of each piston in the output drive side is thus the angle multiplied by the number of lobes on the cam ring, and is therefore 3×angle, or 0, 120, 240, 360, 0 . . . degrees. Since there are thus only three phases, just three piston/cam followers are placed around the input drive cam ring, and 3 sets of hydraulic pipes 106 connect the input drive system and the output drive system. The embodiment shown in FIG. 2b is thus a 3:1 speed reducer.

Referring again to FIG. 2a, if 31 piston/cam followers are positioned equally around the output drive system cam ring (not shown), then the physical angle of each piston is 11.6, 23.2, 34.8, 46.5 . . . and the phase angle is 0, 116, 232, 348, 105 . . . which gives 31 different phases. This means that now 31 piston/cam followers can be used on the output drive system cam ring, which are connected to the 31 pistons surrounding the input drive system cam ring by 31 independent hydraulic pipes. For a drive cam ring having one lobe, as shown in FIGS. 2a and 2b, then this embodiment would be a direct drive (1:1) connection.

Referring now to FIG. 3, in a further embodiment, a linear cam 302 replaces the cam ring connected to the output shaft, and the corresponding pistons are arranged linearly; in this embodiment a linear rather than a rotational output is achieved. Thus the hydraulic drive system of the present invention may be used for the gear-less and valve-less interconversion of rotational energy, for the conversion of rotational energy to linear kinetic energy, and for the conversion of linear kinetic energy to rotational energy.

In the foregoing, the pistons are shown in the diagrams schematically and all have similar dimensions; however, the stroke of the pistons need not be the same. The only things that must match between the drive and the driven side are: (a) The number of phases must be the same, and (b) within each phase, the volume displaced by the driven and the drive side must be the same. In the foregoing, the diameter of the cams rings are shown to be roughly equal; however it is not outside the scope of the present invention for the diameter of the cam rings, and the amplitude of the wave-shaped profile, can be different.

In the foregoing, the cam rings and pistons are shown to be radial to the drive or output shafts, but they could also be axial, with pistons parallel to the axis of rotation and a cam ring of constant radius but changing thickness (not shown). As shown in FIG. 3, the cam element need not be a ring; it could be a wavy surface (elevator linear actuator, for example)

The drive system of the present invention may be used in a number of applications where hydraulic transmission systems are currently used, for example in hoists and generators. Advantageously, the present invention does not use valves and thus is simpler to operate and maintain.

What is claimed is:

1. A hydraulic drive system comprising:
   (i) an input drive system comprising:
      (a) one or more hydraulic fluid lines;
      (b) a first cam element having a first wave-shaped profile;
      (c) a first plurality of hydraulically-driven piston units connected to said one or more hydraulic fluid lines, said first plurality of hydraulically-driven piston units having cam rollers which are disposed to act against said first cam element so that a movement of the first wave-shaped profile against the cam rollers produces a plurality of phases of oscillating fluid flow in said one or more hydraulic fluid lines, and said relative position of said cam rollers against said cam element determines a relative phase angle for said oscillating fluid flows;
   (ii) an output drive system comprising:
      (a) a second cam element having a second wave shaped profile;
      (b) a second plurality of hydraulically-driven piston units having cam rollers which are disposed to act against said second cam element so that a movement of the cam rollers against the second wave-shaped profile caused by said oscillating fluid flow produces a movement of said second cam element; and
   wherein piston units of the input drive system are directly connected by said hydraulic lines to piston units of the output drive system having the same relative phase angle; and wherein the movement of the input drive cam ring elicits the movement of the output drive cam ring.

2. The hydraulic drive system of claim 1 in which the first cam element is connected to a power source.

3. The hydraulic drive system of claim 2 in which the power source is a rotating power source selected from the group consisting of: an electric motor, a diesel engine, a petrol engine, and a turbine system.

4. The hydraulic drive system of claim 1 in which the second cam element is connected to a load.

5. The hydraulic drive system of claim 1 in which the first cam element is a cam ring and is mounted on a load-bearing axle.

6. The hydraulic drive system of claim 5 in which said first plurality of piston units are arranged radially with respect to the load-bearing axle.

7. The hydraulic drive system of claim 5 in which said first plurality of piston units are arranged axially with respect to the load-bearing axle.

8. The hydraulic drive system of claim 1 in which the second cam element is a cam ring and is mounted on a load-bearing axle.

9. The hydraulic drive system of claim 8 in which said second plurality of piston units are arranged radially with respect to the load-bearing axle.

10. The hydraulic drive system of claim 8 in which said second plurality of piston units are arranged axially with respect to the load-bearing axle.

11. The hydraulic drive system of claim 1 in which the first cam element is a linear cam.

12. The hydraulic drive system of claim 1 in which the second cam element is a linear cam.

13. The hydraulic drive system of claim 1 additionally comprising one or more fluid reservoirs, each connected by a check valve to said one or more fluid hydraulic lines.

14. The hydraulic drive system for the interconversion of rotational energy comprising the hydraulic drive system of claim 1 in which the first cam element is a cam ring and is mounted on a first load-bearing axle and rotates at a first angular velocity, and the second cam element is a cam ring and is mounted on a second load-bearing axle and rotates at a second angular velocity.

15. The hydraulic drive system of claim 14 in which the first cam element is a cam ring and is mounted on a first load-bearing axle and the second cam element is a cam ring and is mounted on a second load-bearing axle.

16. The hydraulic drive system of claim 14 in which the ratio of said first angular velocity to said second angular velocity is equal to a number of lobes on said second cam element to a number of lobes on said first cam element.

17. The hydraulic drive system for the conversion of rotational energy to linear kinetic energy comprising the hydraulic drive system of claim 1 in which the first cam element is a cam ring and is mounted on a load-bearing axle and rotates at a first angular velocity, and the second cam element is a linear cam ring and moves at a second velocity.

18. The hydraulic drive system for the conversion of linear kinetic energy to rotational energy comprising the hydraulic drive system of claim 1 in which the first cam element is a linear cam ring and moves at a first velocity, and the second cam element is a cam ring and is mounted on a load-bearing axle and rotates at a second angular velocity.

* * * * *